(12) United States Patent
Andres et al.

(10) Patent No.: US 8,038,460 B2
(45) Date of Patent: Oct. 18, 2011

(54) SAFETY DEVICE FOR A PLUG (PATCH GUARD)

(75) Inventors: Hans Andres, Hinwil (CH); Hans-Peter Bouvard, Biel (CH); Thomas Buergler, Wollerau (CH); Matthias Gerber, Rueti (CH); Hugo Marty, Wolfhausen (CH)

(73) Assignee: Reichle & De-Massari AG, Wetzikon (CH)

( * ) Notice: Subject to any disclaimer, the term of this patent is extended or adjusted under 35 U.S.C. 154(b) by 436 days.

(21) Appl. No.: 11/990,118

(22) PCT Filed: Aug. 8, 2005

(86) PCT No.: PCT/CH2005/000461
§ 371 (c)(1),
(2), (4) Date: Feb. 7, 2008

(87) PCT Pub. No.: WO2007/016794
PCT Pub. Date: Feb. 15, 2007

(65) Prior Publication Data
US 2010/0136809 A1    Jun. 3, 2010

(51) Int. Cl.
*H01R 4/50* (2006.01)
(52) U.S. Cl. ........................................ 439/344

(58) Field of Classification Search .............. 439/344, 439/358, 354, 676
See application file for complete search history.

(56) References Cited

U.S. PATENT DOCUMENTS

| | | | |
|---|---|---|---|
| 5,435,744 A * | 7/1995 | Derstine et al. | 439/352 |
| 5,538,438 A * | 7/1996 | Orlando | 439/344 |
| 6,520,796 B1 | 2/2003 | Reichle | |
| 6,817,902 B2 * | 11/2004 | Bernardi et al. | 439/676 |
| 6,821,024 B2 | 11/2004 | Bates et al. | |
| 6,851,957 B1 | 2/2005 | Bhogal et al. | |
| 6,863,556 B2 * | 3/2005 | Viklund et al. | 439/354 |
| 7,163,414 B2 * | 1/2007 | Lo et al. | 439/352 |
| 2003/0063862 A1 | 4/2003 | Fillion et al. | |

FOREIGN PATENT DOCUMENTS

EP    1371114 A    9/2004

* cited by examiner

*Primary Examiner* — Briggitte R Hammond
(74) *Attorney, Agent, or Firm* — The Nath Law Group; Jerald L. Meyer; Stanley N. Protigal

(57) ABSTRACT

A security device for a plug (1) has at least one locking clip (2) said security device comprising a lockable closure piece (8, 12) which prevent the manual operation of the locking clip (2). The closure piece (8, 12) comprises a closure lower piece (8) which may be fixed to the plug (1) on which a separate closure upper piece (12) is placed. Said closure lower piece (8) is designed such as to be clipped on the plug (1) with a positive and/or non-positive fit.

21 Claims, 4 Drawing Sheets

SAFETY DEVICE FOR A PLUG (PATCH GUARD)

Figure 1:
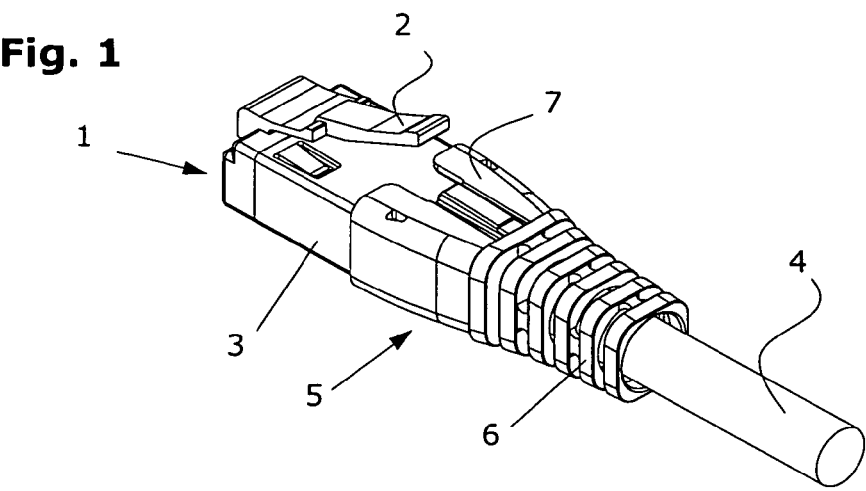

This disclosure relates to a safety device for a plug of a plug connection wherein said plug includes at least one locking clip and the safety device includes a lockable closure piece that prevents the manual operation of at least one locking clip.

With the increasing networking of electronic equipment in the business sector, especially in the automated manufacturing sector of modern industry, the safety of plug connections is continuously gaining in importance. An uncontrolled interruption of data transmission within such a network can result in malfunctions, expensive loss of production or fatal data losses.

In recent years, devices have therefore been developed to improve the safety and reliability of cablings and plug connections. Thus for example, there is known from WO 02/075859 a safety device for a plug connection in which the socket-contact is provided with an outwardly protruding, collar-shaped safety element into which a conventional RJ-45 plug can be inserted. To this end, the safety element completely covers the locking clip of this plug, making unintentional operation of the locking clip impossible. This plug connection can be released again only with a suitable key and has proven itself in practice. When a plurality of plug connections of this type are secured in this manner and densely arranged next to one another, the width of the collar-shaped safety element limits the slot density to a corresponding slot field. Today however, there exists the need to further increase the number of usable slots on one slot field.

A plug assembly kit in which the locking clip of the plug is designed fork-shaped was therefore suggested in U.S. Pat. No. 6,863,556. To prevent unintentional separation of the plug connection, there is provided a bushing, which is arranged such as to slide over the plug and which must be pushed manually in order to unclip the locking clip out of the corresponding catches in the socket and thus be able to remove the plug from the socket. This completely newly conceived assembly kit unfortunately requires that existing cabling arrangements be re-equipped, and slot fields that are already equipped cannot be retrofitted in a simple manner.

The safety devices known from U.S. Pat. No. 6,851,957 or U.S. Pat. No. 6,821,024 likewise also require special modifications to the shaping of the plug housing.

Another suggestion for the design of a safety device is known from US 2003/0063862. This printed publication describes an optical duplex connector to the plug part of which there is attached a complicatedly constructed housing. This housing includes a flap that protrudes over the end of the plug clips and can be swiveled by a slide mechanism in such a manner that the plug clips are pressed into their release position. Unfortunately, this device does not prevent the clips from being operated at any time. In particular, this safety device cannot be locked.

It is therefore desired to create a lockable safety device that is constructed in the simplest manner possible and that also enables a high slot density in narrow space conditions and that can be used with existing plug arrangements, especially with standardized plugs, i.e. does not require modifications to existing plug types.

This objective is achieved by a safety device ("patch guard") having the features of a plug connection wherein said plug includes at least one locking clip and the safety device includes a lockable closure piece that prevents the manual operation of at least one locking clip, and especially by a safety device for a plug of a plug connection wherein the plug includes at least one locking clip and the safety device includes a lockable closure piece that prevents manual operation of at least one locking clip, this closure piece comprising a closure lower piece that can be fixed on the plug and it being possible to place a separate closure upper piece upon said closure lower piece.

The closure lower piece is preferably designed such as to be clipped on the plug with positive and/or non-positive fit. To secure the plug connection, the slide piece includes, on its locking-clip side, at least one wedging element, which is located underneath at least one locking clip when the slide piece is in its closed position. In another embodiment, the slide piece includes to this end at least one cover element, which is located above at least one locking clip when the slide piece is in its closed position and prevents manipulation of the locking clip.

In a preferred configuration, the slide piece can be locked to the closure lower piece. This is intended to ensure safety from unintentional manipulations. To this end, the slide piece can preferably be locked to the closure lower piece with the aid of at least one locking element attached to the closure lower piece.

It is self-evident that the locking element can just as well be fastened to the closure upper piece or to the slide piece, respectively.

In particular, the locking element can be designed as a separate component and preferably as a spring tongue such as to lock into a detent point of the slidable counterpart. To again unlock the slide piece, the locking element can be released out of the detent point with the aid of a separate tool, especially a key.

In a special embodiment, the slide piece is provided with a locking-clip hold-down element, which presses the locking clip down when the slide piece slides from the closed position into the release position, thereby enabling immediate separation of the plug connection without further manipulations.

In another configuration, the closure upper piece is designed as a housing piece that covers a release element that can be operated with the aid of a separate tool, especially a key, in such a manner that, when operated with the tool, this release element presses the locking clip down and thereby enables easy separation of the plug connection.

In a development of the safety device, the closure upper piece can be equipped with an exchangeable code, especially a color code. Such codes have proven their worth in the assembly of plug connections and facilitate correct assignment and placement for the person skilled in the art.

The disclosed techniques can be used with all conventional plug connectors comprising clips, also including in particular fiber-optic plugs, such as LC connectors, SG connectors, Opti-Jack connectors and MT connectors, or with RJ connectors.

Figure 2:
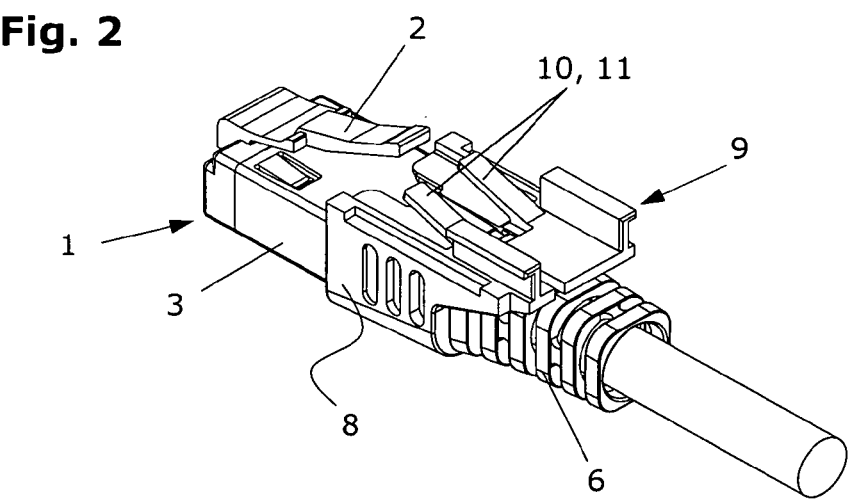
Figure 3:
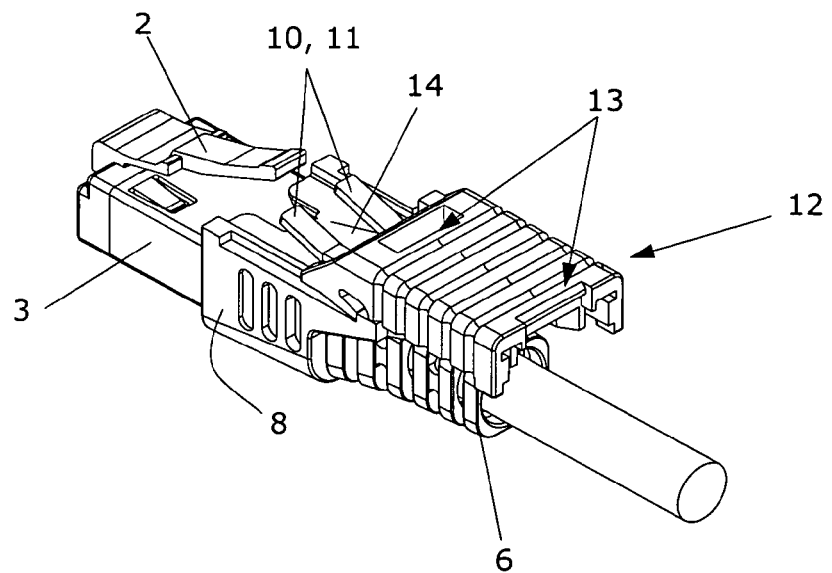
Figure 4:
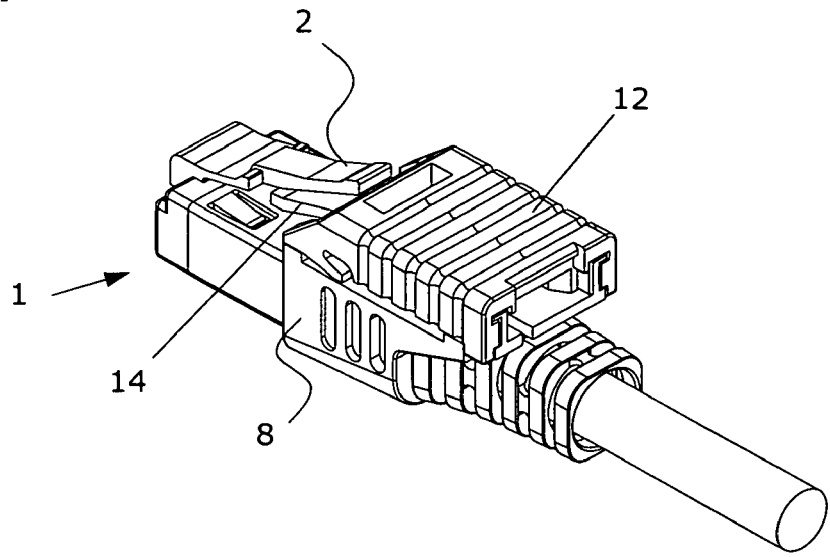
Figure 5:
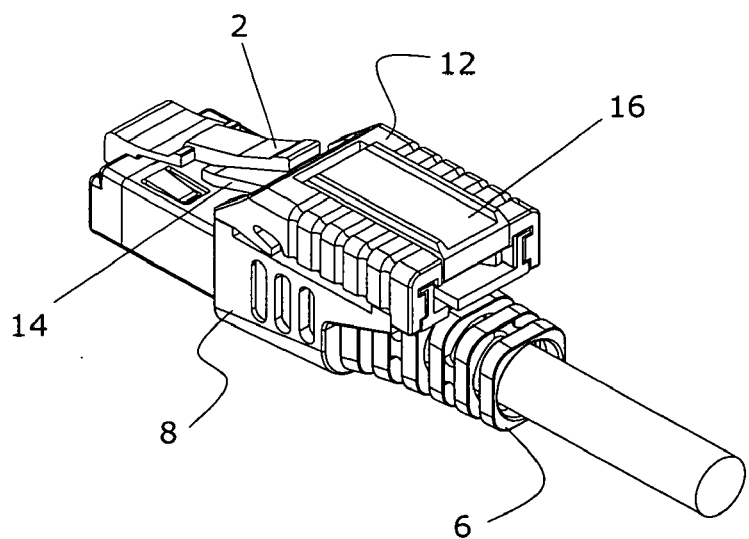
Figure 6:
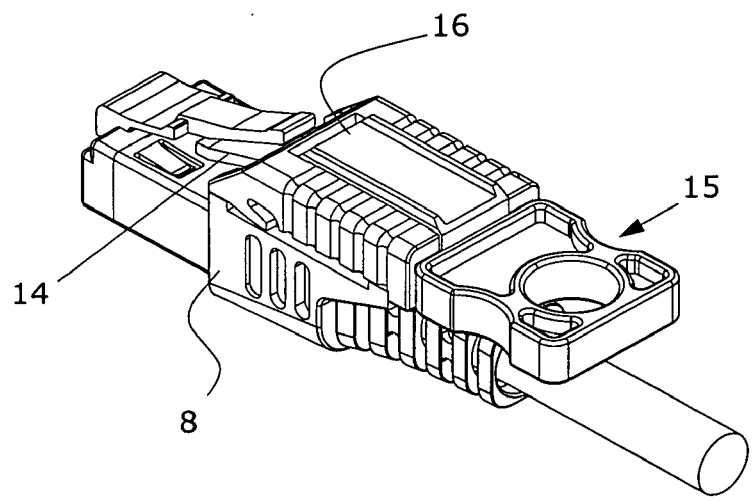
Figure 7:
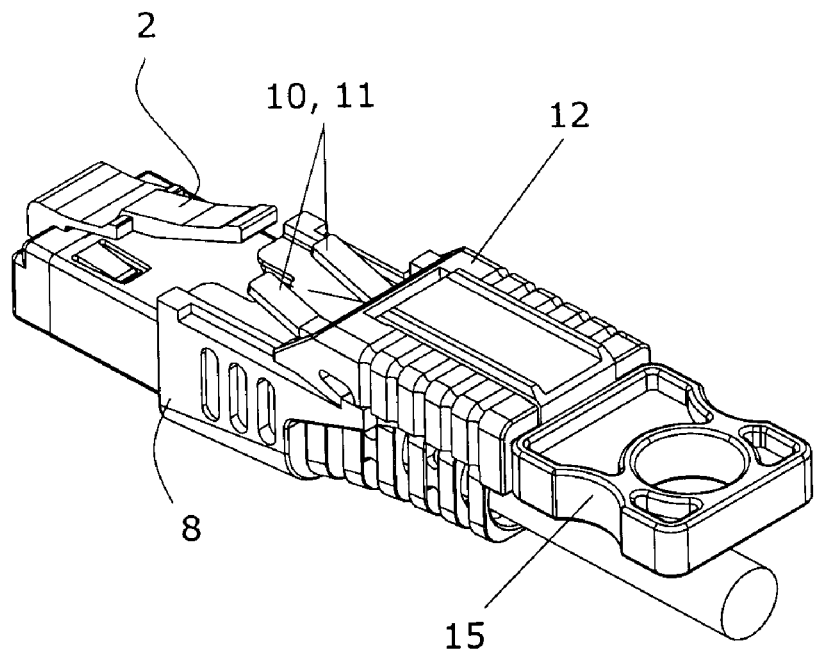
Figure 8:
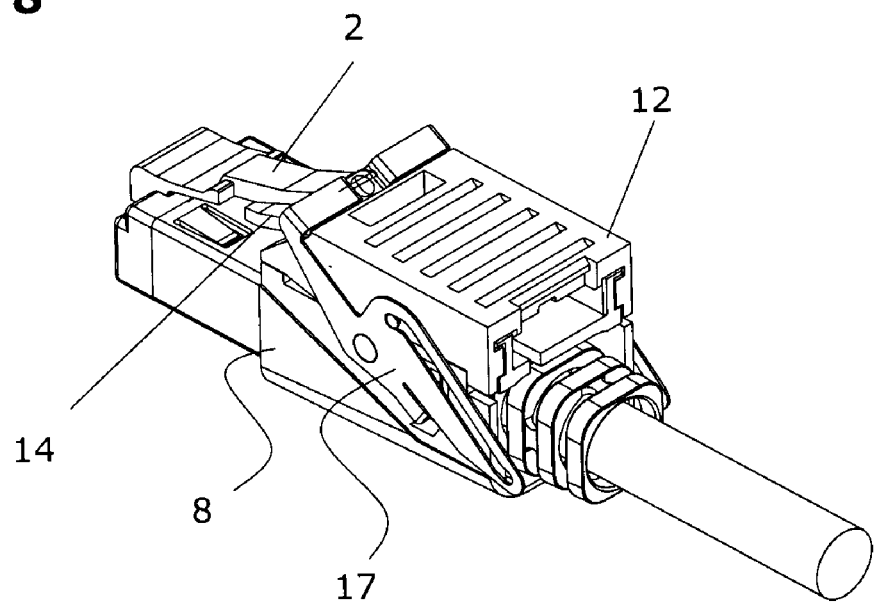
Figure 9:
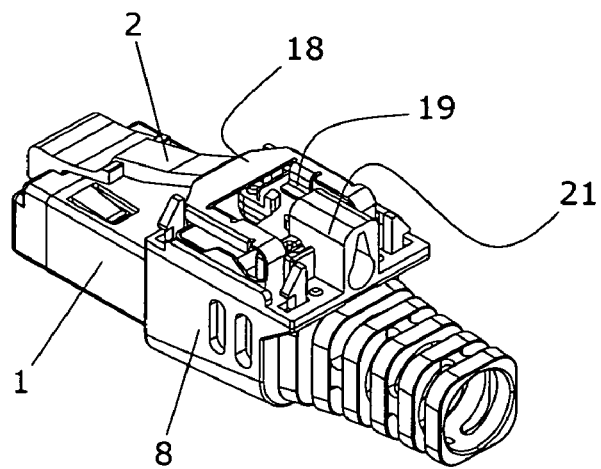
Figure 10:
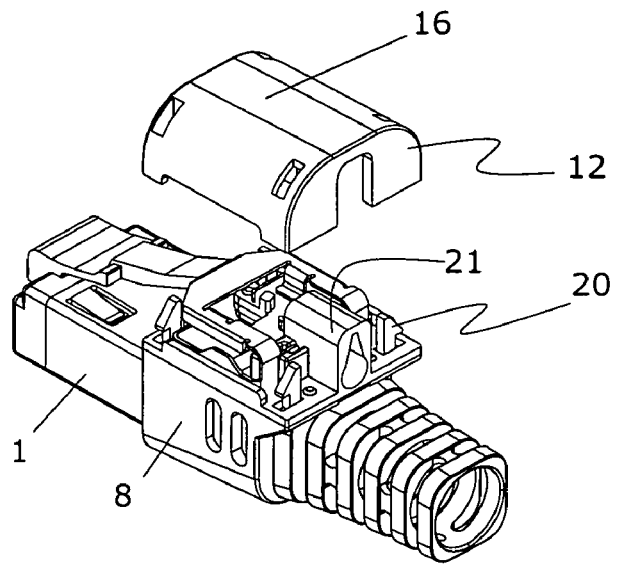
Figure 11:
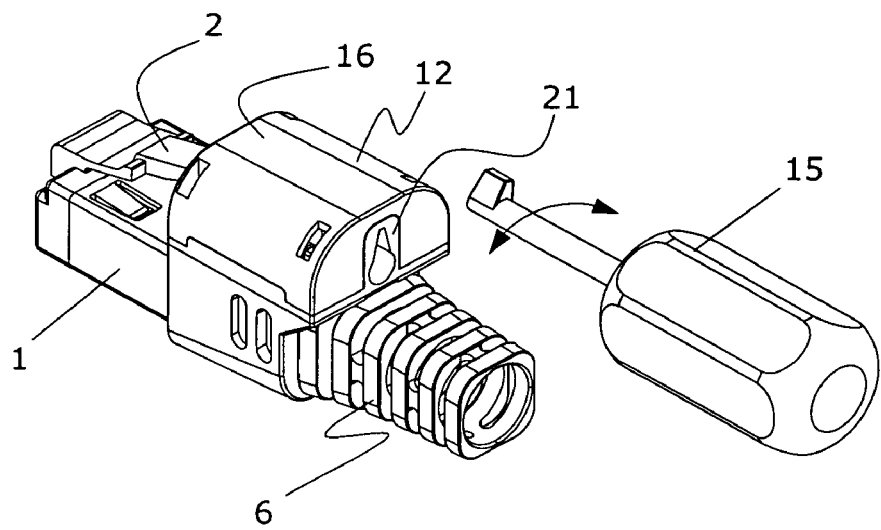

The disclosed techniques will be explained in more detail below using the example of a standardized plug connector, particularly on the basis of an RJ-45 plug, and with the aid of the figures. The drawing shows:

FIG. 1: spatial representation of a conventional RJ-45 plug with bend protection;

FIG. 2: spatial representation of the plug as per FIG. 1 with a closure lower piece;

FIG. 3: spatial representation of the plug as per FIG. 2 with a slide piece in release position;

FIG. 4: spatial representation of the plug as per FIG. 3 with a slide piece in closed position;

FIG. 5: spatial representation of the plug as per FIG. 4 with color-coded clip;

FIG. 6: spatial representation of the plug as per FIG. 5 in closed position and with inserted key for unlocking;

FIG. 7: spatial representation of the plug as per FIG. 6 with inserted key in release position;

FIG. 8: spatial representation of the plug with a clip hold-down element;

FIG. 9: spatial representation of the plug as per FIG. 1 with another type of closure lower piece;

FIG. 10: spatial representation of the plug as per FIG. 9 with opened housing piece;

FIG. 11: spatial representation of the plug as per FIG. 9 with closed housing piece and tool for unlocking;

In this connection, "plug connector" should be understood to mean a component that, with the aid of a fitting counterpart, enables a connection to be established between separated electrical and/or optical conductors. Plug connections thus always consist of two plug connectors, as a rule a plug and a socket, possibly an adapter. In the following, "plug" is to be understood as any type of insertable connectors, thus also including an insertable fiber-optic connector in particular. As a rule, these known plugs comprise a housing with a locking clip, with or without bend protection.

The plug 1 illustrated in FIG. 1 is a conventional RJ-45 plug with a locking clip 2. In the inserted state, this locking clip locks into a counterpart—a socket—and prevents unintentional separation of the plug connection. As a rule, these types of plugs include a screen sheet 3, which screens the contacts and their leads from external electro-magnetic noise fields. These leads are carried in a cable 4. It has proven its worth to provide the location between plug 1 and cable 4 with a bend protection 5, as described in EP-1'128'487, for example. This bend protection 5 reduces the mechanical load, especially tensile forces and bending moments, on the individual contacts and leads within the plug 1. The bend protection 5 illustrated in FIG. 1 includes a flexible part 6 and a solid housing piece 7, which is suitable for carrying additional functional parts, such as the coding means described in the cited EP-1'128'487.

FIG. 2 depicts the same RJ-45 plug 1 with locking clip 2, screen sheet 3 and bend protection 5, but with a closure lower piece 8 placed upon it. In the preferred embodiment, this closure lower piece 8 can be clipped to the solid housing piece 7 of the bend protection 5 in a simple manner, leading to a positive and/or non-positive fastening. Other fastening techniques (like gluing, insert molding, etc.) are sufficiently known to the person skilled in the art and can be used just as well. It is self-evident that in appropriate cases the closure lower piece and bend protection can also be designed as one-piece integral construction, i.e. can consist of one piece. This closure lower piece 8 furthermore includes a slide guide piece 9 and two locking elements 10, 11. This slide guide piece 9 serves for accommodating another component, a slide piece 12 (FIG. 3), enabling it to slide into a closed position and a release position. The locking elements 10, 11 illustrated in this FIG. 2 are integrally connected to the closure lower piece 8 and serve to lock the slide piece 12 in its closed position. Of course, these locking elements 10, 11 can also be produced out of a metallic material and be anchored either in the closure lower piece 8 or in the closure upper piece 12.

FIG. 3 depicts the same plug 1 as in FIG. 2 with a closure lower piece 8, but with a slide piece 12 placed on the slide guide piece 9 (FIG. 2). This slide piece 12 can slide on the slide guide piece 9 (FIG. 2) of the closure lower piece 8 and can move back and forth in the axial direction like a sled. In FIG. 3, the slide piece 12 is in its release position, i.e. the locking clip 2 is freely accessible and can be operated. The two locking elements 10, 11, which are designed as a spring tongue, are likewise free. The safety device being explained in detail here includes a wedging element 14 that is arranged on the side of the locking clip and which comes to rest below the locking clip 2 when the slide piece 12 is in the closed position. To this end, it has proven important that this wedging element 14 occupy the entire space underneath the locking clip 2, if possible. It is self-evident that a cover element can also be provided for this same function in place of the wedging element 14. In addition, recesses 13, which serve to accommodate a color-coded clip 16 (FIG. 5), are yet provided in the slide piece 12 illustrated in FIG. 3. It is self-evident that other known embodiments of coding means can be used in place of a color-coded clip 16, especially coding means in the form of geometrical or mechanically intermeshing gearings.

FIG. 4 depicts the plug as per FIG. 3, but with a slide piece 12 positioned in the closed position. In this connection, the wedging element 14 protrudes essentially completely underneath the locking clip 2 and thereby prevents operation of same. At the same time, the two locking elements 10, 11 (FIG. 3) are now located inside the slide piece 12 and engage suitable detent points in order to fix and lock the slide piece 12 in this closed position. The slide piece 12 cannot readily slide out of this position and back into the release position. This ensures that the plug 1 cannot be separated from the plug connection unintentionally and/or by undesired malfunctions, a separation which, according to the circumstances, can result in irreparable damage or unrecoverable data losses or even destruction of machines and/or tools. It is self-evident that the person skilled in the art can also readily use other locking elements 10, 11 of different design and, in particular, can also attach them to the slide piece 12 and that these can be made of another material, preferably metal, and used.

FIG. 5 depicts the same safety device as in FIG. 4, but the slide piece 12 is equipped with a color-coded clip 16. The slide piece 12 is in the closed position and prevents locking clip 2 from being pressed down. At the same time, the locked-in locking elements 10, 11 lock the slide piece 12, i.e. this piece can no longer readily slide out of this position. A separate key 15 (FIG. 6), which is capable of pressing the two locking elements 10, 11 out of their detent points (not illustrated) is needed to make this possible. Only this pressing enables the slide piece 12 to slide back to the slide piece guide 9 (FIG. 2) and, in particular, arrive at the release position.

FIG. 6 depicts the safety device as per FIG. 5, but with an inserted key 15. If the key 15 is in the position illustrated in this case, then the slide piece 12 is indeed unlocked but still in the closed position, i.e. the slide piece 12 still prevents the operation of the locking clip 2.

Only when the slide piece 12 has been brought into its release position, as illustrated in FIG. 7, does the locking clip 2 of plug 1 also become accessible again and can be operated again to release the plug 1 from its connection. The geometry of the key 15 is adapted to the special shape and accessibility of the locking elements 10, 11. The use of forgery-proof lock-and-key geometries lies within the scope of routine technical practice of the person skilled in the art and is not subject matter of the disclosed techniques.

FIG. 8 illustrates a special development of the safety device. In this embodiment, a shackle-like locking-clip hold-down element 17 is linked to the closure lower piece 8. The sliding of slide piece 12 out of the closed position illustrated in FIG. 8 into the release position causes the locking-clip hold-down element 17 to swivel such as to press the locking clip 2 downwards and hold the locking clip 2 down in the release position. In this connection, the locking clip no longer needs to be operated separately after release and the plug connection can be separated in the simplest possible way.

FIG. 9 depicts another embodiment of the safety device without housing piece. In this device, the closure lower piece 8 attached over plug 1 is provided with a release element 18. This release element includes a shackle-shaped component that protrudes over the locking clip 2 of the plug 1. This shackle-shaped component is designed to be springy and a tool can press it down by way of lateral brackets 19. When the shackle-shaped component of this release element 18 is pressed down, the locking clip 2 is likewise pressed down and pressed out of its locking position, enabling the plug to be pulled out of the plug connection, i.e. the plug connection can be separated.

FIG. 10 clarifies how the housing piece 12 of the safety device can be placed on the closure lower piece 8. Latches arranged in the corner regions hold the housing piece 12 to the closure lower piece in the mounted state. The closure lower piece 8 furthermore includes an access element 21, which grants the access of a suitable tool to the release element 18 and its brackets 19. The housing piece 12 is preferably provided with a surface for the code 16.

As evident in FIG. 11, the housing piece 12 covers the entire release element 18 in the mounted state and thereby also covers an essential portion of locking clip 2.

To be able to operate the release element, it is first necessary to guide a tool 15, in the form of a key in this case, through the access element 21 and rotate it in the inserted state. It is thereby possible to release locking clip 2 from its detent position and to separate the plug connection.

It is self-evident that the disclosed techniques were described here for an

RJ-45 plug only for the sake of example and that the safety device can be used for all types of plug connectors that include a clip or similar locking mechanism. Thus it is possible to equip electrical as well as optical or electro-optical mono or multiple connectors with the safety device.

The invention claimed is:

1. Safety device for a plug of a plug connection wherein said plug includes at least one locking clip, the safety device comprising:
   a lockable closure piece that prevents the manual operation of at least one locking clip, the closure piece comprising a closure lower piece mountable on the plug in a fixed manner and a separate closure upper piece, said closure lower piece configured to accept the closure upper piece thereon,
   characterized in that:
   the closure lower piece is designed such as to be clipped on the plug with positive or non-positive fit, and
   the closure upper piece is designed as a slide piece, which slide piece can slide into a closed position and into a release position and which slide piece includes, on a side having said locking clip, at least one wedging element, which wedging element is located underneath at least one locking clip when the slide piece is in its closed position.

2. Safety device for a plug of a plug connection wherein said plug includes at least one locking clip, the safety device comprising:
   a lockable closure piece that prevents the manual operation of at least one locking clip, the closure piece comprising a closure lower piece mountable on the plug in a fixed manner and a separate closure upper piece, said closure lower piece configured to accept the closure upper piece thereon,
   characterized in that:
   the closure lower piece is designed such as to be clipped on the plug with positive or non-positive fit, and
   the closure upper piece is designed as a slide piece, which slide piece can slide into a closed position and into a release position and which slide piece includes, on a side having said locking clip, at least one cover element, which cover element is located above at least one locking clip when the slide piece is in its closed position.

3. Safety device according to claim 2, characterized in that the slide piece can be locked to the closure lower piece with the aid of at least one locking element attached to the closure lower piece.

4. Safety device according to claim 2, characterized in that the slide piece can be locked to the closure lower piece with the aid of at least one locking element attached to the slide piece.

5. Safety device according to claim 3, characterized in that the locking element is designed as a separate component.

6. Safety device according to claim 3, characterized in that the locking element is designed as a spring tongue.

7. Safety device according to claim 3, characterized in that the slide piece can be unlocked with the aid of a separate tool or key.

8. Safety device according to claim 3, characterized in that the slide piece is provided with a locking-clip hold-down element, which presses the locking clip down when the slide piece slides from the closed position into the release position and thereby enables easy separation of the plug connection.

9. Safety device for a plug of a plug connection wherein said plug includes at least one locking clip, the safety device comprising:
   a lockable closure piece that prevents the manual operation of at least one locking clip, the closure piece comprising a closure lower piece mountable on the plug in a fixed manner and a separate closure upper piece, said closure lower piece configured to accept the closure upper piece thereon,
   characterized in that
   the closure upper piece is designed as a housing piece that covers a release element, which release element can be operated with the aid of a separate tool or key, in such a manner that, when operated, this release element presses the locking clip down and thereby enables easy separation of the plug connection.

10. Safety device according to claim 1, characterized in that the closure upper piece is equipped with an exchangeable indicia or code.

11. Safety device for a plug of a plug connection wherein said plug includes at least one locking clip, the safety device comprising:
   a lockable closure piece that prevents the manual operation of at least one locking clip, the closure piece comprising a closure lower piece mountable on the plug in a fixed manner and a separate closure upper piece, said closure lower piece configured to accept the closure upper piece thereon; and
   the closure piece positionable between a closed position and into a release position and which closure piece includes, on a side having said locking clip, at least one wedging element, located in a blocking position with respect to at least one locking clip upon positioning the slide piece in its closed position.

12. Safety device according to claim 11, characterized in that the closure lower piece is designed such as to be clipped on the plug with positive or non-positive fit.

13. Safety device according to claim 11, characterized in that the closure upper piece is designed as a slide piece, which slide piece can slide into said closed position and said release position and which slide piece includes, on a side having said locking clip, at least one wedging element, which wedging element is located underneath at least one locking clip when the slide piece is in its closed position.

14. Safety device according to claim 11, characterized in that the closure upper piece is designed as a slide piece, which slide piece can slide into said closed position and said release position and which slide piece includes, on a side having said locking clip, at least one cover element, which cover element is located above at least one locking clip when the slide piece is in its closed position.

15. Safety device according to claim 14, characterized in that the slide piece can be locked to the closure lower piece with the aid of at least one locking element attached to at least one of the closure lower piece and the slide piece.

16. Safety device according to claim 15, characterized in that the slide piece is provided with a locking-clip hold-down element, which presses the locking clip down when the slide piece slides from the closed position into the release position and thereby enables easy separation of the plug connection.

17. Safety device according to claim 11, characterized in that the closure upper piece is designed as a housing piece that covers a. release element, which release element can be operated with the aid of a separate tool, especially a key, in such a manner that, when operated, this release element presses the locking clip down and thereby enables easy separation of the plug connection.

18. Safety device according to claim 3, characterized in that the locking element is designed as a separate component.

19. Safety device according to claim 3, characterized in that the locking element is designed as a spring tongue.

20. Safety device according to claim 3, characterized in that the slide piece can be unlocked with the aid of a separate tool or key.

21. Safety device according to claim 3, characterized in that the slide piece is provided with a locking-clip hold-down element, which presses the locking clip down when the slide piece slides from the closed position into the release position and thereby enables easy separation of the plug connection.

* * * * *